Patented Sept. 1, 1931

1,821,444

UNITED STATES PATENT OFFICE

ERNEST A. MUNNS, OF NEW YORK, N. Y.

PAINT AND ENAMEL COMPOSITION

No Drawing. Application filed February 2, 1927. Serial No. 165,501.

My invention relates to improvements in paint and enamel compositions.

In the manufacture of ordinary oil paints and enamels finely ground or pulverized dry pigment bases are employed which are mixed with and carried by a suitable liquid vehicle. Such paints are not adapted for use in the formation of high relief or raised ornamental work because after application to a surface the particles coalesce to obliterate the brush marks and to obliterate or tend to obliterate and destroy any uneven effect which may be desired.

The general object of the present invention is to provide a paint or enamel of novel composition and of a character such that it may be applied to surfaces in stippled form or in configurations forming designs of any character desired to produce a desired ornamental effect.

It also is an object of the invention to provide a paint or enamel composition comprising a base including as an ingredient a relatively coarse powdered or granulated material which is adapted to provide a surface texture of a character to produce a pleasing and ornamental appearance.

Another object of the invention is to provide a paint or enamel composition in which the base shall consist either wholly or partially of granulated or powdered asbestos fiber or other suitable fiber or equivalent material.

In the detailed description of the invention which follows I shall point out and describe various compositions which come within the scope of my invention, but I desire it to be understood that my invention is not limited to the various compositions which I shall describe, nor to the exact proportions which I may set forth.

An essential feature of my invention is that the base shall consist either of asbestos powder, or its equivalent, alone, or of such powder mixed with other ingredients as a base.

It also is an essential characteristic of a composition embodying my invention that it shall be applied to surfaces to be coated or covered thereby in paste or semi-plastic form so that after application to such surfaces any designs or configurations which may be formed by manipulations of the brush or other means of application remain as originally formed.

When ordinary liquid paints or enamels are applied there is a certain amount of flow thereof after application to a surface, in consequence of which brush marks and other configurations become obliterated as a result of which the surface presents a smooth, more or less even appearance or effect.

In the application of a paint or enamel composition embodying my invention I preferably employ a paint brush having stubby, more or less stiff bristles, such for instance as may be found in a brush which has been used until it is about half worn out.

In the manufacture of paint and enamel compositions embodying my invention the asbestos or other equivalent base which is mixed with the vehicle or carrier should be relatively coarse, yet at the same time it should be of a fineness to permit it to pass through the mesh of an ordinary wire window screen.

The use of a base in relatively coarse form as suggested tends to prevent the flowing of the paint after its application to a surface, so that after application it retains any form, ornamental or otherwise, which may have been given to it in the application thereof.

One example of a composition embodying my invention and which may be employed consists of a mixture of powdered asbestos, the particles of which are relatively coarse, as a base mixed or intermingled with a good drying linseed oil in proportions to produce a pasty mass. Such a composition may then be applied to any surface which has been properly prepared and is adapted to receive a coating of paint.

When a paint having this composition is applied to an object it presents a texture which is pleasing to the eye and such a paint is characterized by the fact that in its application it may be given a stippled effect which is permanent because there is no coalescence of adjoining particles or portion thereof after it has been applied. By properly manipulating the brush, as for instance giving it a half turn at proper times during the application of the paint, the paint may be applied in uneven thicknesses to produce such surface configurations as may be desired and as may be within the skill of the painter. If the points of any of the raised portions should appear to be too sharp or not quite of the shape or configuration desired the painter or other artist may shape the same by means of a suitable tool, as for instance, a pallet or modeling tool. In other words, the paint is of such character that it may be shaped and textured in its application to a surface.

If it should be desired to produce a white paint and at the same time retain a surface texture such as is produced by the presence of relatively coarse powdered asbestos or any equivalent thereof (such for instance as coarse mica powder) a proportion of the said asbestos powder may be replaced by white lead, oxide of zinc, lithopone, titanium oxide, or similar white metallic pigment bases. The percentage of asbestos powder base which may be replaced by any or a mixture of these white pigment bases may be varied to meet the idea of the person mixing the ingredients but should not exceed forty percent. of the total base. Preferably the amount should be less. In other words, the proportion of white metallic pigment bases to the asbestos or equivalent base should not exceed forty percent. of the total base but preferably should be even a less percentage. In some cases, as for instance when it is not desired to retain the surface texture produced by the use of asbestos powder of the character indicated, the amount of such powder may be considerably reduced and replaced by other pigments such as barytes, silex (silica), whiting, gypsum, or other similar inert substances.

In fact, coarse powder of asbestos or its equivalent may be mixed or intermingled with various other kinds of ingredients adapted for use as bases in the manufacture of paints and enamels and in various proportions depending upon the purpose for which it is to be used and upon the surface texture which may be desired.

Various kinds of drying oils, varnishes, turpentine and the like may be employed as thinners, when required, in the manufacture of the paint or enamel embodying the invention.

It may be noted also that sulphonated fish oil, fish oil treated with sulphur chloride or other metallic chlorides, nitro cellulose or admixtures of good vegetable oils may be employed as the vehicle or binder required instead of the linseed oil to which reference has been made already.

Instead of a composition consisting of asbestos in relatively coarse powder form with linseed oil or its equivalent as above suggested, I may produce a paint embodying my invention by mixing together powdered asbestos, zinc oxide, boiled linseed oil, exterior spar varnish and turpentine in the proportions of about seven hundred pounds of asbestos powder, about three hundred pounds of zinc oxide, about three hundred and seventy-five pounds of boiled linseed oil, about one hundred and twenty-five pounds of exterior spar varnish, and about two hundred and fifty pounds of turpentine.

A compound consisting of these ingredients mixed together in about the proportions indicated is in pasty form ready for application in the manner as already indicated in connection with the product consisting of linseed oil and asbestos in coarse powder form.

As already indicated, the proportions as last given may be varied and any other suitable white pigments may be substituted for or used in place of the zinc oxide.

The essential feature of my invention is that the paint or enamel compound shall include asbestos in coarse powder form alone as a base, or such powder mixed with other ingredients, in such proportions as may be necessary to produce a resulting product suitable for the purposes and to the places for and in which the same may be used. As has been indicated already, a coarse powder of any other substance which may be the equivalent of the asbestos powder may be substituted therefor.

Having thus described my invention, what I claim and desire to secure by Letters Patent is:

1. A paint composition consisting of a mixture of approximately one thousand pounds of inert pigment the major portion of which consists of relatively coarse asbestos powder, three hundred and seventy-five pounds of linseed oil, one hundred and twenty-five pounds of varnish, and two hundred and fifty pounds of turpentine intermingled to produce a pasty semi-plastic mass which is adapted to be shaped and textured in its application to the surface of an object.

2. A paint composition for ornamental purposes consisting of approximately seven hundred pounds of relatively coarse asbestos powder, three hundred pounds of zinc oxide, three hundred and seventy-five pounds of linseed oil, one hundred and twenty-five pounds of varnish, and two hundred and fifty pounds of turpentine intermingled to produce a pasty semi-plastic mass which is adapted to be shaped and textured in its application to the surface of an object for ornamenting the same.

In testimony that I claim the foregoing as my invention, I have hereunto signed my name this 17th day of December, 1926.

ERNEST A. MUNNS.